US006538247B2

United States Patent
Iizuka

(10) Patent No.: US 6,538,247 B2
(45) Date of Patent: Mar. 25, 2003

(54) METHOD OF DETECTING ARRANGEMENT OF BEAM SPOTS

(75) Inventor: Takashi Iizuka, Saitama-ken (JP)

(73) Assignee: Pentax Corporation, Tokyo (JP)

(*) Notice: Subject to any disclaimer, the term of this patent is extended or adjusted under 35 U.S.C. 154(b) by 35 days.

(21) Appl. No.: 09/929,008

(22) Filed: Aug. 15, 2001

(65) Prior Publication Data
US 2002/0024008 A1 Feb. 28, 2002

(30) Foreign Application Priority Data
Aug. 24, 2000 (JP) ........................... 2000-253564

(51) Int. Cl.[7] .................................................. H01J 3/14
(52) U.S. Cl. ..................... 250/234; 250/201.9; 347/241
(58) Field of Search .......................... 250/234, 201.9, 250/225, 574, 578.1, 559.04, 559.06; 347/243, 239, 242, 245, 241, 232; 359/204, 618

(56) References Cited

U.S. PATENT DOCUMENTS

| | | |
|---|---|---|
| 5,798,784 A | 8/1998 | Nonaka et al. |
| 5,844,592 A | 12/1998 | Iizuka |
| 6,011,250 A | 1/2000 | Minakuchi et al. |
| 6,084,716 A * | 7/2000 | Sanada et al. .............. 359/629 |
| 6,369,932 B1 * | 4/2002 | Gerchberg .................. 359/237 |

FOREIGN PATENT DOCUMENTS

JP 6-208072 7/1994

OTHER PUBLICATIONS

English Language Abstract of JP 6-208072.

* cited by examiner

Primary Examiner—Kevin Pyo
Assistant Examiner—Seung C. Sohn
(74) Attorney, Agent, or Firm—Greenblum & Bernstein, P.L.C.

(57) ABSTRACT

A positional relationship of a plurality of beam spots for a multi-beam imaging apparatus is detected. The imaging apparatus including a light source, a beam splitter that divides a received beam into a plurality of beams, a deflecting system that deflects the beams to scan, and an imaging optical system that forms a plurality of scanning beam spots on a surface. According to the method, a phase filter is provided between the light source and the beam splitter. The filter is configured to divide a cross section of the beam into a plurality of areas, light fluxes passed through adjoining two areas having an optical path difference of half a wavelength. Dark lines are formed, in each beam spot, due to the phase difference of the adjoining two areas. By detecting the dark lines of respective beam spots, a positional relationship between the plurality of beam spots can be determined.

12 Claims, 6 Drawing Sheets

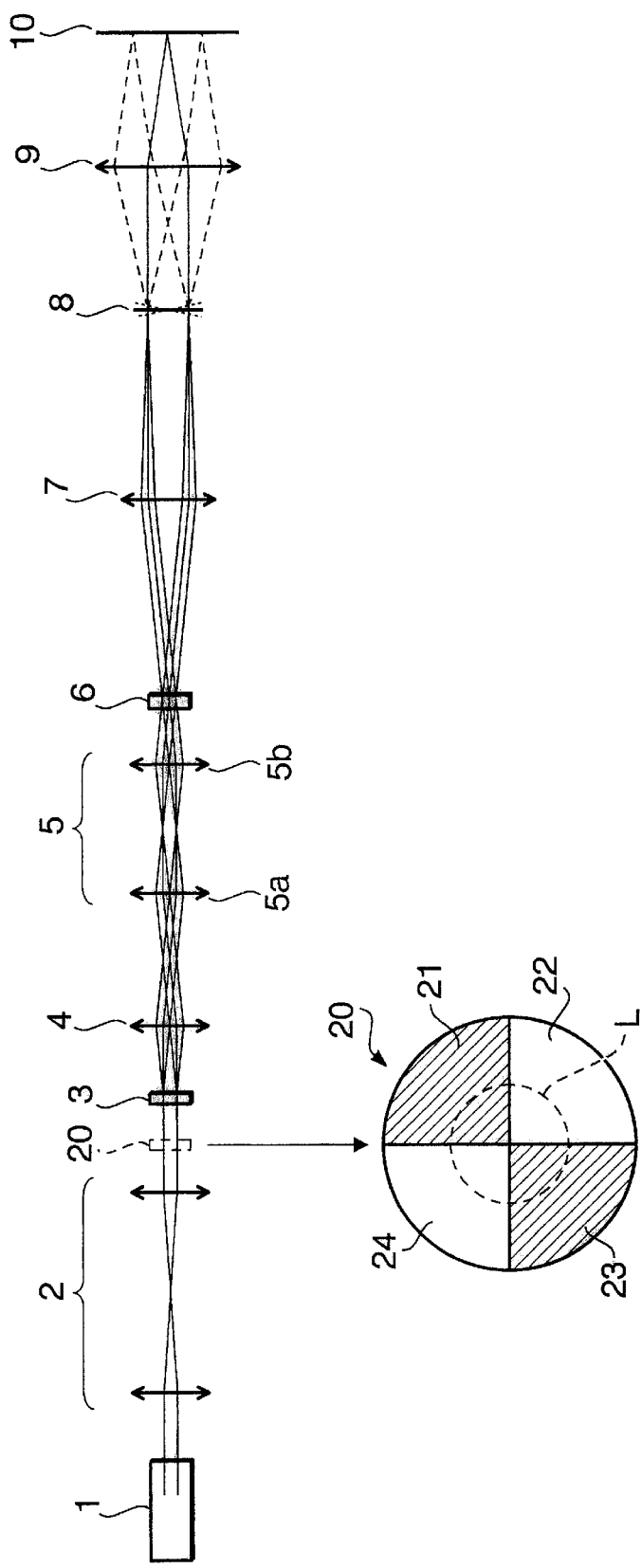

METHOD OF DETECTING ARRANGEMENT OF BEAM SPOTS

BACKGROUND OF THE INVENTION

The present invention relates to a method of detecting the arrangement of a plurality of beam spots in a multi-beam imaging apparatus.

A multi-beam imaging apparatus typically divides a beam emitted by a light source into a plurality of beams directed to a surface to be scanned. Specifically, the plurality of divided beams are converged to form beam spots on the surface, respectively. By scanning the beam spots with respect to the surface in a direction which is different from the direction where the beam spots are arranged, and by modulating respective beams, a two dimensional image is formed on the surface.

In this type of multi-beam imaging apparatus, in order to make the intervals between scanning lines formed by the scanning beam spots, it is important that the plurality of beam spots are arranged evenly, in particular in the auxiliary scanning direction, on the surface to be scanned. If the beam spots are unevenly arranged, the scanning lines are not formed at an even pitch, and the quality of the formed image may be deteriorated.

An optical system of the multi-beam imaging apparatus is therefore designed such that the beam spots are evenly arranged on the surface. However, due to aberrations of the optical system and/or manufacturing errors of the optical system, there may be some unevenness in the interval between the beam spots. Therefore, it is necessary to detect the arrangements of the beam spots after the optical system is assembled, and adjust the intervals therebetween.

Conventionally, the intervals are detected based on the intervals between the scanned lines as printed. Alternatively, a photo-electric conversion element such as a CCD (Charge Coupled Device) is placed at a certain position so that the plurality of the beams spots are formed thereon, and the positions of the beams are directly detected.

However, in the former method, the result of the adjustment cannot be known immediately. That is, until the scanning lines are printed, whether the adjustment is appropriate or not is unknown. If the adjustment is insufficient, the adjustment is performed again, and then the scanning lines should be printed again to check whether the adjustment is appropriate. Thus, it takes time and it is troublesome if the former method is taken. According to the latter method, since each beam spot is detected as an intensity distribution, it is difficult to determine a position of the beam spot or a center of the beam spot accurately. The center of gravity may be assumed as the center of the beam spot. However, the intensity distribution may include individual disturbance, and in such a case, if all the beam spots are treated in a similar manner, the arrangement of the beam spots may not be adjusted accurately.

SUMMARY OF THE INVENTION

It is therefore an object of the invention to provide an improved method of detecting an arrangement of a plurality of beam spots instantly and accurately.

For the above object, according to the invention, there is provided a method of detecting a positional relationship of a plurality of beam spots for a multi-beam imaging apparatus, the imaging apparatus including a light source emitting a beam, a beam splitter that receives the beam emitted by the light source and divides the beam into a plurality of beams, a deflecting system that deflects the plurality of beams to scan, and an imaging optical system that converges the plurality of scanning beams on a surface to form the plurality of beam spots. According to the method, a phase filter is provided between the light source and the beam splitter. The filter is configured to divide a cross section of the beam directed from the light source to the beam splitter into a plurality of areas. Light fluxes passed through adjoining two of the plurality of areas of the phase filter have an optical path difference of half a wavelength, so that at least a dark line is formed in each beam spot due to the phase difference of the adjoining two areas. A positional relationship of dark lines respectively formed on the plurality of beam spots are detected to determine a positional relationship between the plurality of beam spots.

According to this method, only by inserting a phase filter, the arrangement of a plurality of beam spots can be detected instantaneously.

The dark lines thus formed and bright areas on either sides of each dark line provides a high contrast portion, which enables an accurate detection of the beam position. Further, since the phase filter is inserted on an upstream side of the beam splitter, the dark lines appear similarly in all the beam spots. Accordingly, relative positions of the beam spots can be detected accurately.

In one particular case, the phase filter divides a cross section of the beam into four areas in a circumferential direction with respect to the center thereof. Each adjoining two areas provides an optical path difference of half a wavelength to the light passed therethrough. A dark line is formed on the beam spot at a portion corresponding to a boundary of each adjoining two areas.

In this case, the dark lines intersect at one point. Therefore, the position of each beam can be detected easily.

Optionally, the four areas are substantially evenly arranged. In this case, a cross-shaped dark lines are formed on each beam spot.

Alternatively, the phase filter may include a central area and at least one surrounding area surrounding the central area. Light fluxes passed through the central area and the at least one surrounding area have an optical path difference of half a wavelength. Dark lines are formed one the beam spot at portions corresponding to a boundary of the central area and the at least one surrounding area.

Optionally, the central area may be a circular area, and the surrounding area is an annular area.

In this case, within a circular bright area (i.e., a beam spot), a concentric dark circle is observed. Thus, the position of each beam spot can be detected easily.

According to another aspect of the invention, there is provided a phase filter used for detecting a positional relationship of a plurality of beam spots in a multi-beam imaging apparatus. The imaging apparatus includes a light source emitting a beam, a beam splitter that receives the beam emitted by the light source and divides the beam into a plurality of beams, a deflecting system that deflects the plurality of beams to scan, and an imaging optical system that converges the plurality of scanning beams on a surface to form the plurality of beam spots. The phase filter includes a plurality of filtering areas to which the light beam is incident, and a cross section of the light beam is divided into a plurality of divided areas by the plurality of filtering areas. Light fluxes passed through adjoining two of the plurality of filtering areas of the phase filter have an optical path difference of half a wavelength.

If the filter is inserted in an optical path between the light source and the beam splitter, detection of an arrangement of the beam spots on the surface to be scanned can be performed easily.

Optionally, the filter is configured to divide a cross section of the beam into four areas in a circumferential direction with respect to the center thereof. Each adjoining two areas provide an optical path difference of half a wavelength to the light passed therethrough.

The four areas may be divided by two lines perpendicular to each other.

In another case, the filter has a central area and at least one surrounding area that surrounds the central area. Light fluxes passed through the central area and the at least one surrounding area have an optical path difference of half a wavelength.

The central area and the at least one surrounding area may be divided by a circle.

BRIEF DESCRIPTION OF THE ACCOMPANYING DRAWINGS

FIG. 1A schematically shows a configuration of an optical system of a multi-beam imaging apparatus according to an embodiment of the invention;

FIG. 1B is a plan view of a phase filter employed in the optical system shown in FIG. 1A;

DETAILED DESCRIPTION OF THE EMBODIMENTS

Figure 2A:
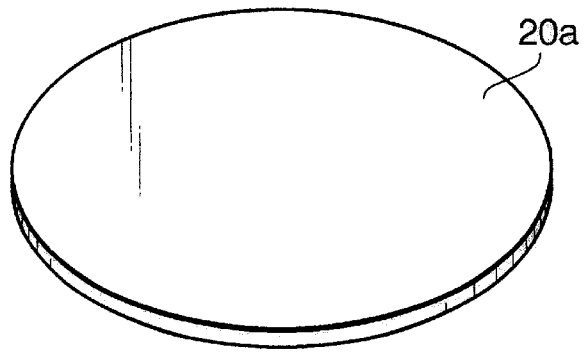
FIGS. 2A–2C illustrate how the phase filter is formed.

Hereinafter, a method of detecting an arrangement of beam spots and phase filters according to embodiments will be described with reference to the accompanying drawings.

First Embodiment

FIG. 1A schematically shows a configuration of an optical system of a multi-beam imaging apparatus to which the method according to an embodiments of the invention is applicable, and FIG. 1B is a plan view of a phase filter 20 according to a first embodiment of the invention, which is applicable to the optical system shown in FIG. 1A.

The multi-beam imaging apparatus includes a light source 1, a beam expander 2, a diffractive beam splitter 3, a converging lens 4, a relaying optical system 5, a multi-channel modulator 6, a collimating lens 7, a polygonal mirror 8, and an fθ lens 9. In FIG. 1A, 10 denotes a surface to be scanned. That is, a plurality of beam spots are formed on the surface 10.

In the optical system shown in FIG. 1A, the light source 1 is a laser source such as an Argon laser source. A laser beam emitted by the light source 1 is incident on the beam expander 2, whereby a diameter of the beam is adjusted. The diffractive beam splitter 3 receives the beam emitted by the light source 1 and splits the beam, which is a parallel light beam, from the beam expander 2 by diffracting the same. It should be noted that the split beams emerge from the beam splitter 3 at different angles.

Each of the plurality of beams split by the diffractive beam splitter 3 is converged by the converging lens, passes through the relaying optical system, which includes a first group 5a and a second group 5b, and is incident on the multi-channel modulator 6 such as an AOM (acousto-optic modulator). It should be noted that the plurality of beams directed from the relay optical system 5 are modulated independently from each other. The plurality of modulated beams are incident on the polygonal mirror 8 through the collimating lens 7, thereby deflected to scan in a predetermined angular range. The deflected beams form a plurality of beam spots on the surface 10, the beam spots being scanning in a predetermined (main scanning) direction.

When the arrangement of the beams are to be detected for adjustment, the phase filter 20 is inserted between the light source 1 and the diffractive beam splitter 3. In the embodiment, as shown by broken lines in FIG. 1A, the phase filter 20 is inserted between the beam expander 2 and the diffractive beam splitter 3.

The phase filter 20 divides a cross section of a beam L into a plurality of areas (four areas in the example shown in FIG. 1B), and provides an optical path difference of half a wavelength.

Figure 2B:
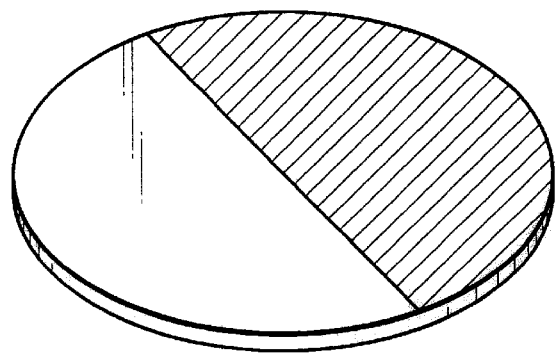
Figure 2C:
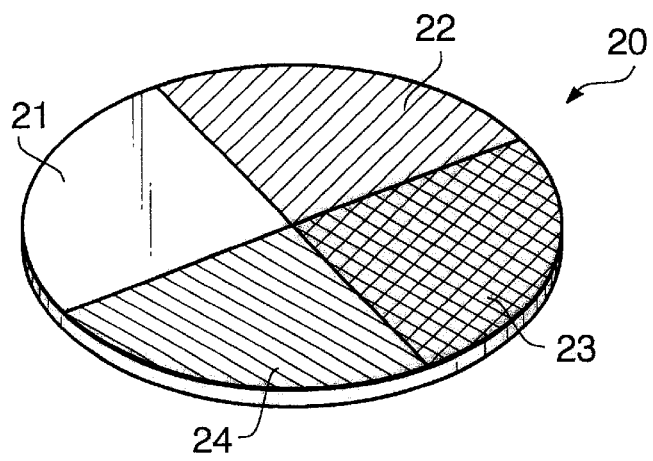

FIGS. 2A–2C illustrate an exemplary procedure for manufacturing the phase filter 20.

Firstly, as shown in FIG. 2A, a transparent disk-shaped glass plate 20a is prepared. A half of an area bordered by a diameter is covered, and on the other half area (which is shown as a hatched area), a thin film layer providing an optical path difference of half a wavelength is formed by a coating process, as shown in FIG. 2B. Next, the covered area of the glass plate 20a is rotated by 90 degrees, and another thin film layer which also provides a half wavelength optical path difference is formed by coating, as shown in FIG. 2C. As a result, the area of the glass plate 20a is divided into four fan-shaped areas: an area 21 which provides no optical path difference; an area 22 which provided an optical path length of half a wavelength; an area 24 which also provides an optical path difference of half a wavelength; and an area 23 which provide one wavelength optical path difference. Since one wavelength optical path difference is optically considered the same as no wavelength optical path difference, the areas 21 and 23 are the same phase (i.e., provide no optical path difference), while the areas 22 and 24 provide a half wavelength optical path difference (i.e., a phase difference).

If the phase filter 20 configured as above is inserted in an optical path, a phase difference of a half wavelength is caused between beams respectively passed through the adjoining areas. Therefore, a beam spot formed on the surface 10 contains areas which are similar to the areas 21–24 having phase differences between adjoining areas. Due to such phase gaps, at the borders of the areas of the beam spot, light fluxes whose phases are shifted cancel each other out so that the intensity there becomes substantially zero. Accordingly, cross-shaped dark lines are formed in a beam spot formed on the surface 10 if the above-configured phase filter 20 is inserted in the optical path.

Figure 3:
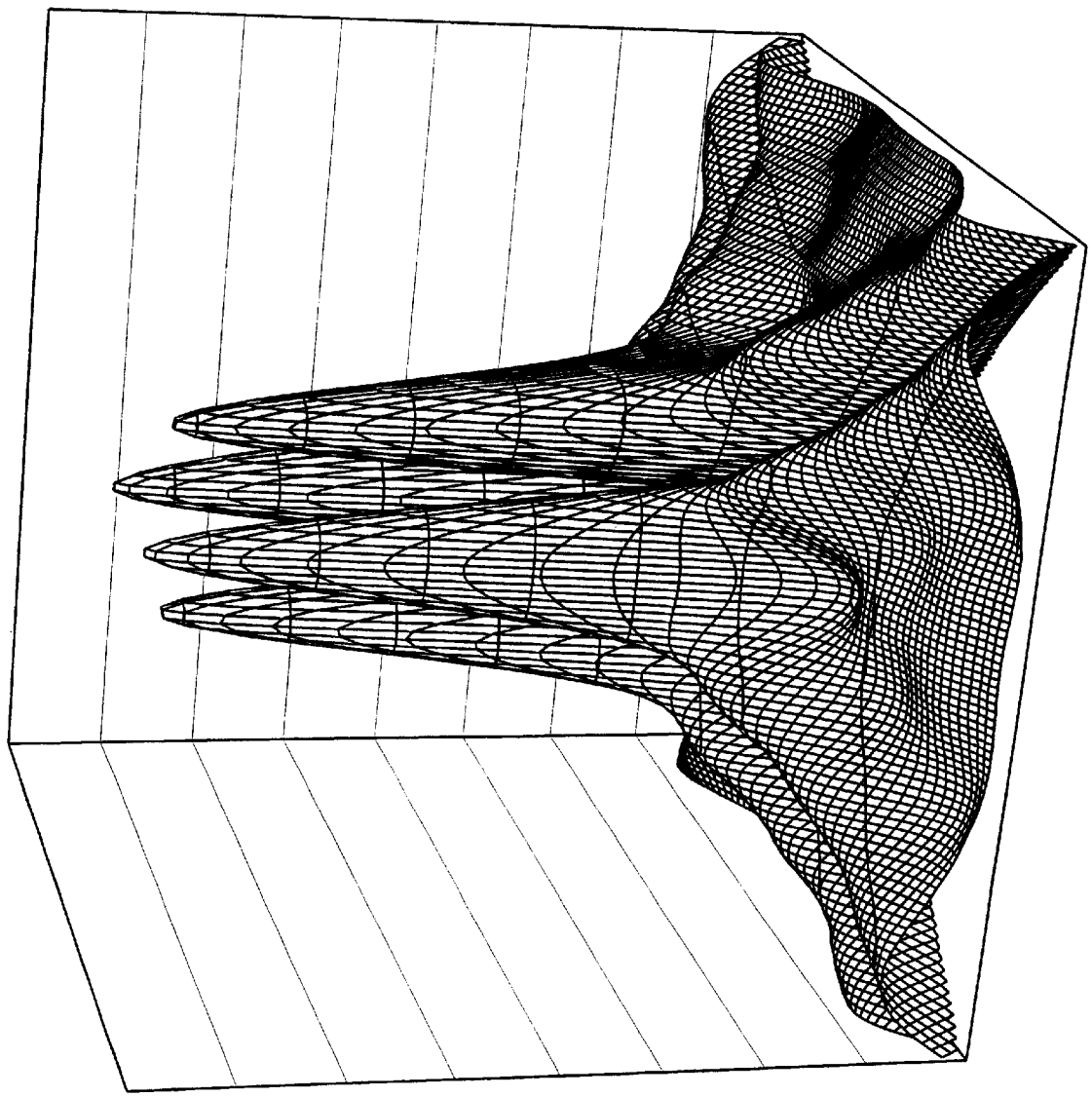
FIG. 3 is a graph showing intensity distribution on a surface to be scanned when the phase filter shown in FIG. 1B is employed.

FIG. 3 is a graph showing a 3D intensity distribution of a beam spot on the surface 10 when the phase filter 20 is used. As shown in FIG. 3, there are four peaks in the intensity distribution, and between the peaks are valleys of the intensity distribution which show as the dark lines of the spot.

Figure 4:
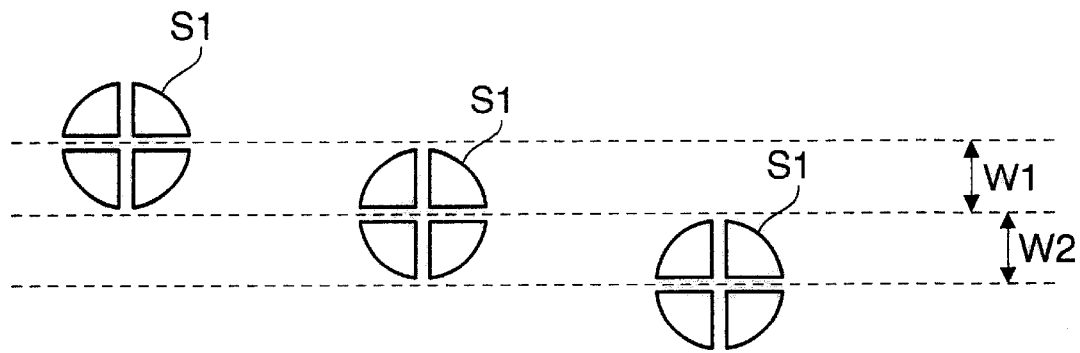
FIG. 4 shows an exemplary arrangement of beam spots on the surface to be scanned when the phase filter shown in FIG. 1B is employed.

In the embodiment, since the diffractive beam splitter 3 is employed, a plurality of beam spots (i.e., three beam spots) are formed on the surface 10, and each of the beam spots S1 has the cross-shaped dark lines, as shown in FIG. 4. The beam spots S1 move along the scanning lines shown in FIG. 4 by broken lines as the polygonal mirror 8 rotates. In FIG. 4, bright areas of the beam spots are indicated as fan-shaped areas. Spaces between the fan-shaped areas are observed as the dark lines of the spot. It should be noted that, in order to realize a high density image, distances W1 and W2 between scanning lines should be made appropriately small. Since each beam spot has the cross-shaped dark lines, by placing a photo-detector on the surface 10, a position of each beam spot can be detected accurately, and therefore, relative distances between the plurality of beam spots can be detected accurately.

Figure 5:
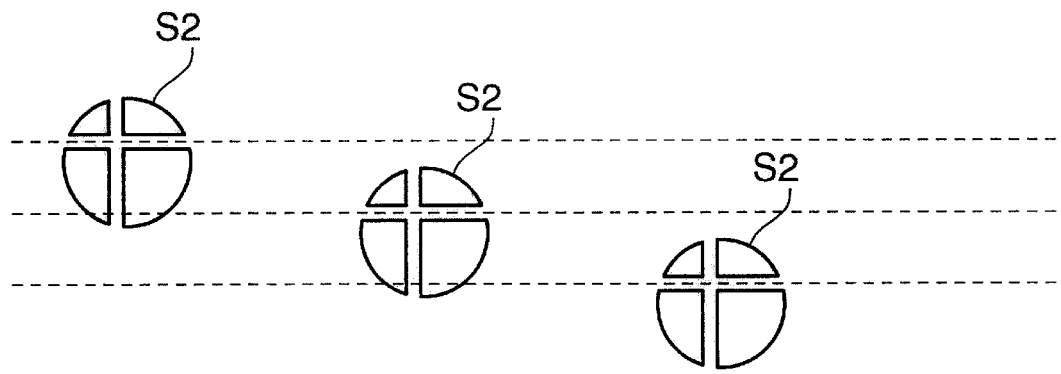
FIG. 5 shows an another exemplary arrangement of beam spots the surface to be scanned when the phase filter shown in FIG. 1B is employed.

Since the phase filter 20 is arranged on the light source side with respect to the diffractive beam splitter 3, all the beam spots have the similar dark lines. Further, if the phase filter 20 is eccentrically arranged, the dark lines are decentered with respect to the center of a beam spot in a similar manner for all the beam spots S2 as shown in FIG. 5. Thus, even in such a case, the relative positions of the beams can be detected accurately.

It should be noted that a detecting method is well known, and an example of a detecting method is disclosed in Japanese Patent Provisional Publication HEI 06-208072. Based on the thus detected positional relationship between the beam spots, the arrangement of the beam spots may be adjusted. Examples of the adjustment of a plurality of beam spots are disclosed in U.S. Pat. Nos. 5,798,784 and No. 5,844,592, teachings of which are incorporated herein by reference.

Second Embodiment

Figure 6:
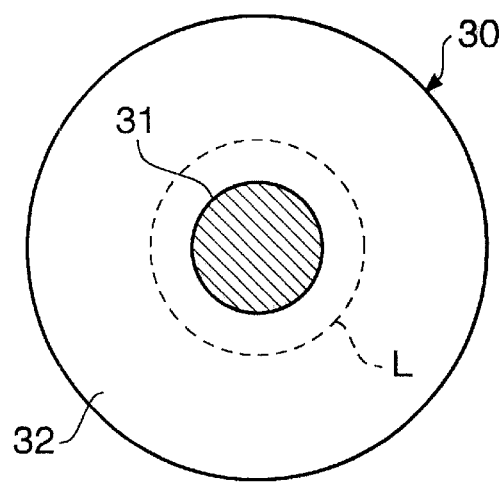
FIG. 6 shows a plan view of another phase filter according to a second embodiment of the invention.

FIG. 6 is a front view of a phase filter 30 according to a second embodiment. According to the second embodiment, the phase filter 30 is configured such that a cross section of a beam L is divided into a plurality of concentric annular (and circular) areas, and an optical difference of half a wavelength is given between light fluxes passed through two adjoining areas. In an example shown in FIG. 6, the disk-shaped phase filter 30 is configured to have a central circular area 31 and an annular area 32 surrounding the circular area 31. The light passed through the circular area 31 and the light passed through the annular area 32 has an optical path difference of half a wavelength.

The phase filter 30 can replace the phase filter 20 shown in FIG. 1A. That is, the phase filter 30 is to be inserted in an optical path between the beam expander 2 and the diffractive beam splitter 3. When the phase filter 30 is employed, an optical path difference of half a wavelength is caused between the light fluxes passed through the two areas 31 and 32. Thus, a beam spot formed on the surface 10 contains similar areas having the optical path difference of half a wavelength. Thus, at the boundary of the areas, of the beam spot, the light fluxes cancel each other out, and the intensity becomes substantially zero. Accordingly, a dark line forming a circle appears in each beam spot formed on the surface 10.

Figure 7:
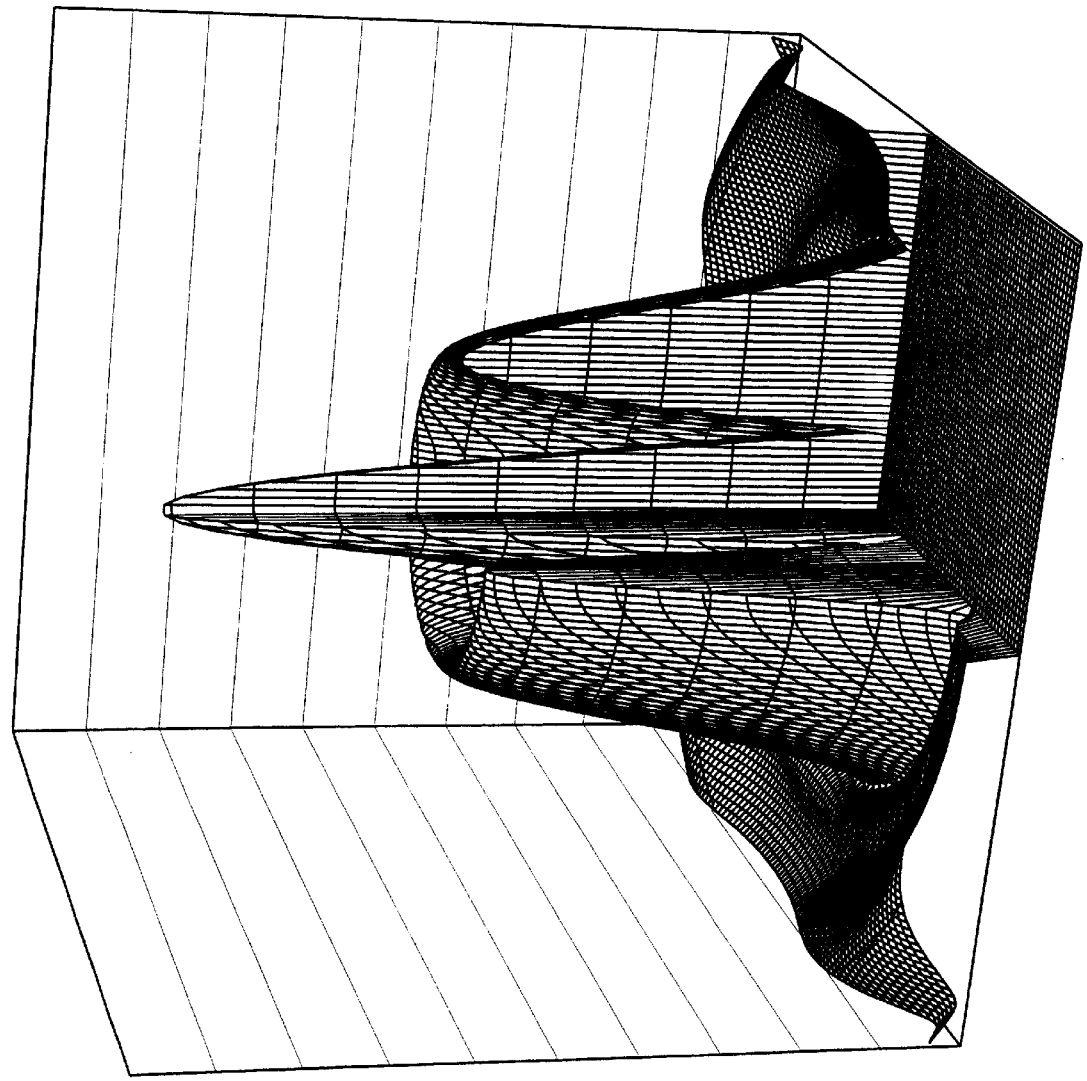
FIG. 7 is a graph showing intensity distribution on the surface to be scanned when the phase filter shown in FIG. 6 is employed.

FIG. 7 is a graph showing a 3D intensity distribution of a beam spot on the surface 10 when the phase filter 30 is used. For the sake of clarity, the graph is made such that a ¼ portion is removed to show a partially cross sectional view. As shown in FIG. 7, there are two peaks: a peak at a central area; and a peak at an annular area surrounding the central area. Between the peaks, a valley (i.e., a low intensity portion) of the intensity distribution is formed, which is observed as the dark circular line on the spot.

Figure 8:
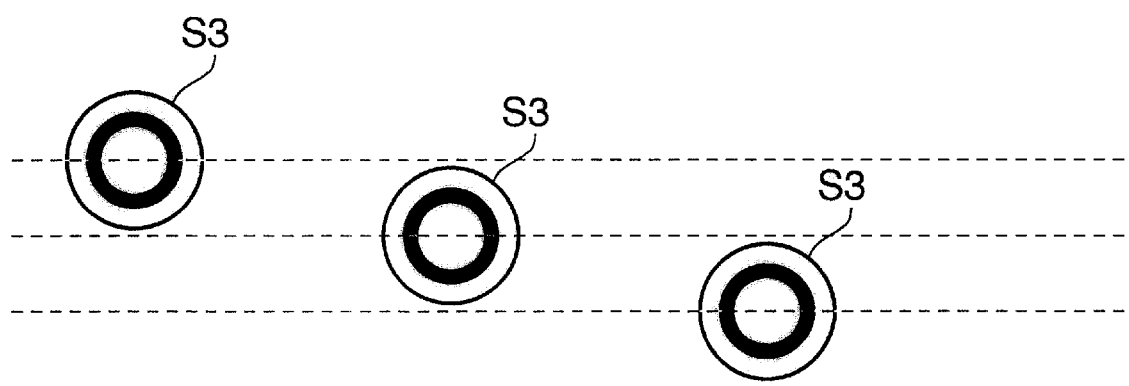
FIG. 8 shows an exemplary arrangement of beam spots on the surface to be scanned when the phase filter shown in FIG. 6 is employed.

In the embodiment, since the diffractive beam splitter 3 is employed, a plurality of beam spots (i.e., three beam spots) are formed on the surface 10, and each of the beam spots S3 has the circular dark line, as shown in FIG. 8. The beam spots S3 move along the scanning lines shown in FIG. 8 by broken lines as the polygonal mirror 8 rotates.

It should be noted that the intensity distribution varies relatively gently at the periphery of each beam spot S3 and therefore, an outline of an entire beam spot S3 is unclear. On the contrary, the dark line due to the phase gap is formed between the two high-intensity areas, and therefore, exhibits a high contrast. Therefore, such a dark line can be recognized clearly. Since each beam spot has the circular dark line, by placing a photo-detector on the surface 10, a position of each beam spot can be detected accurately, and therefore, relative distances between a plurality of beam spots can be detected accurately.

Since the phase filter 30 is arranged on the light source side with respect to the diffractive beam splitter 3, all the beam spots have the similar dark lines. Further, even if the phase filter 30 is eccentrically arranged, all the dark lines are decentered in a similar manner for all the beam spots S3. Thus, even in such a case, the relative positions of the beams can be detected accurately.

The present disclosure relates to the subject matter contained in Japanese Patent Application No. 2000-253564, filed on Aug. 24, 2000, which is expressly incorporated herein by reference in its entirety.

What is claimed is:

1. A method of detecting a positional relationship of a plurality of beam spots for a multi-beam imaging apparatus, the imaging apparatus including a light source emitting a beam, a beam splitter that receives the beam emitted by the light source and divides the beam into a plurality of beams, a deflecting system that deflects the plurality of beams to scan, and an imaging optical system that converges the plurality of scanning beams on a surface to form the plurality of beam spots, said method comprising:

providing a phase filter between the light source and the beam splitter, the phase filter being configured to divide a cross section of the beam directed from the light source to the beam splitter into a plurality of areas, light fluxes passed through adjoining two of the plurality of areas of the phase filter having an optical path difference of half a wavelength, at least a dark line being formed in each beam spot due to the phase difference of said adjoining two; and detecting positional relationship of dark lines respectively formed on the plurality of beam spots to determine a positional relationship between the plurality of beam spots.

2. The method according to claim 1, wherein the phase filter divides a cross section of the beam into four areas in a circumferential direction with respect to the center thereof, each adjoining two areas provides an optical path difference of half a wavelength to the light passed therethrough, a dark line being formed on the beam spot at a portion corresponding to a boundary of each adjoining two areas.

3. The method according to claim 2, wherein the four areas are substantially evenly arranged, a cross-shaped dark lines being formed on the beam spot.

4. The method according to claim 1, wherein the phase filter includes a central area and at least one surrounding area that surrounds the central area, light fluxes passed through the central area and the at least one surrounding area have an optical path difference of half a wavelength, dark lines being formed on the beam spot at portions corresponding to a boundary of the central area and the at least one surrounding area.

5. The method according to claim 4, wherein the central area is a circular area, and wherein the surrounding area is an annular area.

6. A phase filter used for detecting a positional relationship of a plurality of beam spots in a multi-beam imaging apparatus, the imaging apparatus including a light source emitting a beam, a beam splitter that receives the beam emitted by the light source and divides the beam into a plurality of beams, a deflecting system that deflects the plurality of beams to scan, and an imaging optical system that converges the plurality of scanning beams on a surface to form the plurality of beam spots, said phase filter including a plurality of areas, a cross section of the light beam directed from the light source to the beam splitter into a plurality of divided areas by said phase filter, light fluxes passed through adjoining two of the plurality of areas of the phase filter having an optical path difference of half a wavelength.

7. The phase filter according to claim 6, wherein said phase filter is configured to divide a cross section of the beam into four areas in a circumferential direction with respect to the center thereof, each adjoining two areas providing an optical path difference of half a wavelength to the light passed therethrough.

8. The phase filter according to claim 7, wherein the four areas are substantially evenly arranged.

9. The phase filter according to claim 7, wherein the four areas are divided by two lines perpendicular to each other.

10. The phase filter according to claim 7, including a central area and at least one surrounding area that surrounds the central area, light fluxes passed through the central area and the at least one surrounding area having an optical path difference of half a wavelength.

11. The method according to claim 10, wherein the central area is a circular area, and wherein the surrounding area is an annular area.

12. The phase filter according to claim 10, wherein the central area and the at least one surrounding area is divided by a circle.

* * * * *